United States Patent
Kaai

(10) Patent No.: US 7,163,992 B2
(45) Date of Patent: Jan. 16, 2007

(54) METHODS FOR MANUFACTURING A COPOLYMER WITH A HIGH YIELD BY REACTING A VINYL MONOMER AND A MACROMONOMER

(75) Inventor: Michihiro Kaai, Nagoya (JP)

(73) Assignee: Toagosei Co., Ltd., Tokyo (JP)

( * ) Notice: Subject to any disclaimer, the term of this patent is extended or adjusted under 35 U.S.C. 154(b) by 0 days.

(21) Appl. No.: 10/469,667

(22) PCT Filed: Feb. 26, 2002

(86) PCT No.: PCT/JP02/01702

§ 371 (c)(1),
(2), (4) Date: Sep. 2, 2003

(87) PCT Pub. No.: WO02/074822

PCT Pub. Date: Sep. 26, 2002

(65) Prior Publication Data

US 2004/0122195 A1    Jun. 24, 2004

(30) Foreign Application Priority Data

Mar. 15, 2001  (JP)  .............................. 2001-075072

(51) Int. Cl.
*C08F 20/10* (2006.01)
(52) U.S. Cl. .................. 526/329.2; 526/75; 526/317.1; 526/318.45; 525/329.7; 525/330.3; 525/333.3
(58) Field of Classification Search .................. 526/75, 526/317.1, 329.2, 318.45; 525/329.7, 330.3, 525/333.3
See application file for complete search history.

(56) References Cited

U.S. PATENT DOCUMENTS

| | | | |
|---|---|---|---|
| 5,147,952 A | | 9/1992 | Mori et al. |
| 5,710,227 A | * | 1/1998 | Freeman et al. ............ 526/208 |
| 5,910,531 A | * | 6/1999 | Freeman et al. ............ 524/556 |
| 6,046,278 A | * | 4/2000 | Freeman et al. ............ 525/221 |
| 6,376,626 B1 | * | 4/2002 | Chiefari et al. ............... 526/75 |
| 6,388,026 B1 | * | 5/2002 | Campbell et al. ............. 526/64 |
| 6,566,549 B1 | * | 5/2003 | Greenblatt et al. ......... 560/202 |

2003/0176526 A1 * 9/2003 Weissman

FOREIGN PATENT DOCUMENTS

| | | |
|---|---|---|
| EP | 0 687 690 A1 | 12/1995 |
| EP | 1 077 224 A1 | 2/2001 |
| JP | 8-3256 A | 1/1996 |
| JP | 10-502097 A | 2/1998 |
| JP | 10-72513 A | 3/1998 |
| JP | 2000-53708 A | 2/2000 |
| JP | 2000-53709 A | 2/2000 |
| JP | 2001-512753 A | 8/2001 |
| JP | 2001-522386 A | 11/2001 |
| JP | 2002-53628 A | 2/2002 |
| JP | 2002-143668 A | 5/2002 |
| JP | 2002-179991 A | 6/2002 |
| JP | 2002-526614 A | 8/2002 |
| JP | 2002-336672 A | 11/2002 |
| JP | 2003-517063 A | 5/2003 |
| JP | 2003-517065 A | 5/2003 |
| WO | WO 94/21701 A1 | 9/1994 |
| WO | WO 98/47927 A1 | 10/1998 |
| WO | WO 99/07755 A2 | 2/1999 |
| WO | WO 99-07755 A2 | 2/1999 |
| WO | WO 00/20476 A1 | 4/2000 |
| WO | WO 01-04163 A1 | 1/2001 |
| WO | WO 01/44330 A1 | 6/2001 |
| WO | WO 01/44332 A1 | 6/2001 |

OTHER PUBLICATIONS

Kaai, Michihiro, "Synthesis of Macromonomers by High Temperature Polymerization and Their Reactivity," UFO Research and Development Institute *TREND* (2002) pp. 2-10 (Translation included).

* cited by examiner

*Primary Examiner*—Helen L. Pezzuto
(74) *Attorney, Agent, or Firm*—Crompton, Seager & Tufte, LLC

(57) ABSTRACT

A process for producing a copolymer which comprises reacting a vinyl monomer with a macromonomer composition containing a macromonomer. The macromonomer composition is obtained by polymerizing at a temperature of 160 to 350° C. a monomer mixture comprising 10 to 80 wt. % first vinyl monomer having an alkyl group in the α-position, 0 to 30 wt. % styrene as an optional ingredient, and 0 to 90 wt. % one or more other vinyl monomers based on the total amount of all monomers.

10 Claims, No Drawings

US 7,163,992 B2

METHODS FOR MANUFACTURING A COPOLYMER WITH A HIGH YIELD BY REACTING A VINYL MONOMER AND A MACROMONOMER

TECHNICAL FIELD

The present invention relates to a process for producing copolymer. In particular, the invention relates to copolymerization between a specific macromonomer, which is contained in a macromonomer composition, and a vinyl monomer.

RELATED ART

A macromonomer composition is known in the art that is obtained through polymerization of vinyl monomers in a temperature range between 150 and 350° C. Copolymerization between the macromonomer composition and a vinyl monomer, in which a macromonomer contained in the macromonomer composition and a vinyl monomer copolymerize, is also known (PCT international publication WO/07755 and WO98/47927, Japanese Laid-Open Publication 8-3256).

However in some occasions the production is discontinued due to viscosity increase in the reaction liquid of the known monomer compositions. Further the reaction rate of macromonomer and vinyl monomer in the copolymerization reaction can be low when a copolymer is produced by means of a macromonomer composition obtained through known processes. Accordingly, there was limitation to the use of the macromonomer compositions.

Therefore an object of the present invention is to provide a process for producing a copolymer which enables smooth reaction of a macromonomer composition and a vinyl monomer. The macromonomer composition is obtained by polymerization of a first vinyl monomer in a temperature range between 160 and 350° C. Another object of the invention is to provide a process for producing a copolymer, in which the reactivity of a macromonomer contained in the macromonomer composition and the reactivity of a vinyl monomer subjected to polymerization with the macromonomer are high.

SUMMARY OF THE INVENTION

The present invention relates to a process for producing a copolymer by carrying out a reaction between a macromonomer composition which contains a macromonomer at a high concentration, and a vinyl monomer. The macromonomer composition is obtained through polymerization, in a temperature range between 160 and 350° C., of a monomer mixture which contains a first vinyl monomer having an alkyl group in the α-position at 10 to 80 wt. % and styrene at 0 to 30 wt. % with respect to the total amount of all monomers supplied to the production of macromonomer composition.

Embodiments

According to the process for producing a copolymer of the invention, the macromonomer contained in the macromonomer composition and the vinyl monomer are copolymerized by carrying out reaction between the macromonomer composition and the vinyl monomer.

The macromonomer composition is obtained by polymerization in a temperature range between 160 and 350° C. of a monomer mixture. The monomer mixture contains at 10 to 80 wt. % a first vinyl monomer having an alkyl group in the α-position, styrene at 0 to 30 wt. %, and another vinyl monomer at 0 to 90 wt. %, with respect to the total amount of all monomers supplied to the production of macromonomer composition.

The first vinyl monomer having an alkyl group in the α-position is indispensable for the monomer used for production of the macromonomer composition. In addition, optionally styrene and another monomer independent from the first vinyl monomer and styrene are appropriately used.

The first vinyl monomer having an alkyl group in the α-position is a significant component for smoothly performing the copolymerization reaction between the macromonomer and a second vinyl monomer, and for promoting the reaction of the macromonomer and the second vinyl monomer. The first vinyl monomer can include α-alkyl acrylic acid, α-alkyl acrylic amide, α-alkyl acrylate ester, α-alkyl styrene, α-alkyl acrylonitrile, and so forth.

The alkyl group can include alkyl groups having 4 carbon atoms or less, in particular, methyl, ethyl, propyl and butyl. A monomer having a methyl group as the alkyl group is preferable because it is readily available and has good reactivity. An example of such vinyl monomer can include methacrylic acid, methacrylate ester, α-methyl styrene, methacrylonitrile, etc.

Methacrylic acid and methacrylate ester are preferable among the first vinyl monomer because the obtained macromonomer has specifically good reactivity. The methacrylate ester can include methyl methacrylate, ethyl methacrylate, propyl methacrylate, butyl methacrylate, isobutyl methacrylate, 2-ethylhexyl methacrylate, stearyl methacrylate, lauryl methacrylate, decyl methacrylate, cyclohexyl methacrylate, isobornyl methacrylate, benzyl methacrylate, 2-hydroxyethyl methacrylate, 2-hydroxypropyl methacrylate, 2-hydroxybutyl methacrylate, monoglycerol methacrylate, cyclohexanedimethanol monomethacrylate, alcoxyethyl methacrylate, alcoxypropyl methacrylate, glycidyl methacrylate, alokylamonoalkyl methacrylate, dialkylamonoalkyl methacrylate, etc. In addition, polyfunctional monomers such as polyalkyleneglycol dimethacrylate, alkyldiol dimethacrylate, etc can also be used.

The optionally added vinyl monomer is a vinyl monomer different from both of the first vinyl monomer and styrene. The monomer include acrylic acid, acrylate ester, acrylic amide, maleic anhydride, acrylonitrile, vinyl acetate, vinyl chloride, styrene sulfonate, etc. The acrylate can include, methyl acrylate, ethyl acrylate, propyl acrylate, butyl acrylate, isobutyl acrylate, 2-ethylhexyl acrylate, lauryl acrylate, isobornyl acrylate, stearyl acrylate, decyl acrylate, cyclohexyl acrylate, 2-hydroxyethyl acrylate, hydroxypropyl acrylate, hydroxybutyl acrylate, cyclohexanedimethanol monoacrylate, alcoxyethyl acrylate, alcoxypropyl acrylate, polyalkyleneglycol monoacrylate, alkylamonoalkyl acrylate, dialkylamonoalkyl acrylate, etc. The acrykate ester include polyfunctional monomers such as polyalkylene glocol diacrylate and alkyldiol diacrylate, etc.

The macromonomer composition of the present invention is obtained by polymerizing a monomer mixture under certain conditions. The monomer mixture contains a first vinyl monomer at 10 to 80 wt. % with respect to the total amount of all monomers supplied to the production of the macromonomer composition, styrene, at 0 to 30 wt. % and another vinyl monomer different from the above, at 0 to 90 wt. %.

The amount of the first vinyl monomer used is 10 to 80 wt. %, preferably 15 to 75 wt. %, more preferably 20 to 70 wt. %, more preferably 35 to 70 wt. %, and most preferably 40 to 70 wt. %. The viscosity of the polymerization reaction liquid becomes large during the copolymerization of the macromonomer and the vinyl monomer in the case where the amount of the first vinyl monomer is too small, which can lead to discontinuance of the polymerization. The molecular weight distribution, namely weight average molecular weight divided by number average molecular weight, of the polymers produced in this step is extremely large. In the case where the amount of the first vinyl monomer is too large, the proportion of the reacted monomer is low in the production of the macromonomer composition and the production efficiency of the macromonomer can be inferior.

The amount of styrene used is 0 to 30 wt. %, preferably 0 to 20 wt. %, more preferably 0 to 15 wt. %, further preferably 0 to 10 wt. %, and most preferably 0 to 5 wt. %. If the amount of styrene used is too large, the proportion of the reacted macromonomer and vinyl monomer can be low in the polymerization reaction of the macromonomer and the second vinyl monomer. In order to increase the efficiency of the copolymerization reaction using a macromonomer composition containing more than 30 wt. % styrene, it is necessary to carry out the reaction between the macromonomer composition and the second vinyl monomer at a high temperature for a long time. Such example is disclosed in Example 11 of PCT publication WO99/07755. However, the copolymers obtained through a process using high temperature for a long period tend to be significantly colored. Accordingly, it is preferable to carry out the reaction between the macromonomer composition and the second vinyl monomer at a relatively mild condition and to copolymerize the macromonomer and the second vinyl monomer at a high efficiency. Thus, macromonomers are preferably used having fewer styrene units.

The amount of optionally added another vinyl monomer is 0 to 90 wt. %, preferably 20 to 90 wt. %, more preferably 30 to 80 wt. %, further preferably 30 to 65 wt. % and most preferably 30 to 60 wt. %. In the case where the amount of the vinyl monomer other than the first vinyl monomer and styrene used is less, the above described problem of the decreased reaction efficiency can occur due to the large volume of the first vinyl monomer or styrene. When the used amount is too large, the viscosity of the reaction liquid increases in the reaction of the macromonomer composition and the vinyl monomer to constrain discontinuance of the reaction.

The macromonomer composition of the invention is obtained by polymerizing the monomer mixture in a temperature range between 160 and 350° C. The reaction temperature for producing the macromonomer composition is more preferably between 180 and 320° C., further preferably between 200 and 30° C. and most preferably between 220 and 300° C. The macromonomer cannot be obtained at a high yield either when the temperature is low or when the temperature is high. The increase in the rate of polymers without terminal double bonds can lead to production of macromonomer compositions having low macromonomer concentration.

The polymerization time is preferably 0.05 to 2 hours and more preferably 0.1 to 1 hour. The macromonomer yield can be low when the polymerization time is too short and the coloring can be significant in the macromonomer composition when the polymerization time is too long. Japanese Laid-Open Publication 8-3256 discloses in Examples 41 to 46 that the inversion rate (reaction efficiency) of the monomers when a reaction of a monomer mixture containing methacrylic acid (a vinyl monomer having an alkyl group in the α-position) at 50 wt. % is carried out in a temperature range between 250 and 375° C. for 16 seconds was approximately 10 to 20%.

When the concentration of the sum of the monomer and the polymer within the polymerization reaction liquid (hereinafter referred to as "concentration of the monomer etc.") in producing the macromonomer composition is maintained between 50 and 100 wt. %, the macromonomer is efficiently produced. In such case, macromonomer compositions having high reaction efficiency in the copolymerization with the second vinyl monomer are preferably produced. The major composition other than the monomer and its polymers is solvent. In other words, the above preferred condition is substantially identical to the case that the macromonomer composition is preferable when it is obtained by polymerization by using the solvent at a concentration between 0 and 50 wt. % with respect to the polymerization reaction liquid of the macromonomer composition production.

The concentration of the monomers, etc. is more preferably 60 to 100 wt. %, and further preferably 70 to 100 wt. %.

In the case where solvent is used, the solvent can be appropriately selected in view of solubility of the raw materials and the products, and reactivity to the raw materials and the products. The solvents can be ketones, esters, ethers, alcohols, cellosolves, carbitols, aliphatic hydrocarbons, alicyclic hydrocarbons, aromatic hydrocarbons, water, etc. In particular, aceton, methylethyl ketone, cyclohexanone, ethyl acetate, butyl acetate, ethoxyethyl propionate, tetrahydrofuran, diethylene glycol dimethylether, isopropyl alcohol, butyl cellsolve, ethylcarbitol acetate, cyclohexane, toluene, xylene, water, etc.

The macromonomer composition of the invention can be produced by known polymerization method in the range of the above described conditions. The polymerization method can include continuous polymerization, batch polymerization, polymerization by a tubular reactor, etc. The continuous polymerization is a preferred method; in particular, continuous polymerization using continuous stirring tank reactor. In addition according to the method, the copolymerization between the macromonomer and the vinyl monomer is developed smoothly and is preferable because the reaction rate of the macromonomer and the vinyl monomer can be high. The production of the macromonomer composition by continuous polymerization can be performed as taught in PCT publication WO99/07755.

It is possible to use any known radical polymerization initiator in the production of the macromonomer composition. Any known chain transfer agent can also be used.

A condition where the macromonomer content in the macromonomer composition is 60 wt. % or more, and where the content of the polymers devoid of terminal double bonds is 40 wt. % or less, is preferred because the yield of the copolymer is high in the reaction between the macromonomer composition and the second vinyl monomer. It is more preferable when the macromonomer composition contains the macromonomer at 70 wt. % or higher.

The macromonomer contained in the macromonomer composition thus obtained has a structure shown in the chemical formula (1) shown below.

(1)

In chemical formula (1), X represents —COOR, —CONR$_2$, —OR, —OCOR, —OCOOR, —NCOOR, halogen atom, —CN, or optionally substituted phenyl or aryl. Preferable X is —COOR or phenyl. R represents alkyl, hydroxyalkyl, alcoxyalkyl or other optionally substituted alkyl, or phenyl, benzyl, polyalkylene glycol, dialkylaminoalkyl, trialcoxy silylalkyl or hydrogen atom. M represents molecular unit. The symbol "n" is a positive integer representing polymerization degree.

The proportion of macromonomer content in the macromonomer composition can be calculated from the molecular weight obtained from gel permeation chromatography (hereinafter referred to as "GPC") and the double bond concentration obtained from nuclear magnetic resonance spectroscopy (hereinafter referred to as "NMR").

The process for producing copolymers of the invention relates to a method in which macromonomer composition and the second vinyl monomer is reacted, in other words the macromonomer contained in the macromonomer composition and the second vinyl monomer is copolymerized.

Any of the vinyl monomer among the first vinyl monomer having alkyl group in the α-position, styrene and the vinyl monomer different from the above two can be used for the second vinyl monomer without limitation.

The method for reacting the macromonomer composition and the second vinyl monomer, namely the method for copolymerizing the macromonomer contained in the macromonomer composition and the second vinyl monomer can also be selected without limitation. Any known polymerization method such as solution polymerization, emulsion polymerization, dispersion polymerization, graft polymerization etc., can be used. The solvent used in the solution polymerization can be either of water, organic solvent or a mixture thereof. The solvent used in the dispersion polymerization can be either water, organic solvent or a mixture thereof. The solution polymerization is a preferable polymerization technique because the film formed from the produced copolymer tend to be superior in water-resistant property and gloss.

The polymerization temperature is preferably in a range between 0 and 350° C., more preferably 10 and 200° C., further preferably 20 and 150° C., and most preferably 30 and 130° C., though the temperature is not necessarily limited to these. The reaction period can be too long when the temperature is too low, and the products can be significantly colored when the temperature is too high.

The polymerization time is generally 0.1 to 30 hours, preferably 0.3 to 20 hours, more preferably 0.5 to 15 hours and further preferably 1 to 10 hours.

Any known radical polymerization initiator can be used in the copolymerization of the macromonomer and the second vinyl monomer. The radical polymerization initiator can include ditertially butyl peroxide, tertially butyl hydroperoxide, benzoyl peroxide, peroxides such as hydrogen peroxide, and azo initiators such as azo-bis-isobutylonitrile etc. Red-ox initiators in which peroxides and reducing agent are combined can also be used. Any known chain transfer agent can also be used when necessary.

The copolymers obtained by copolymerization of the macromonomer and the second vinyl monomer exist as either of graft copolymers or block copolymers, or in a state in which both of these are mixed. Needless to say, polymers in which the unreacted macromonomers themselves or the unreacted vinyl monomers themselves are polymerized can also exist. The structure of the obtained copolymers and the proportion of each kind of the copolymers obtained depend on the composition of the macromonomer, kinds of vinyl monomers and the polymerization conditions, etc.

The technique disclosed in PCT publication WO98/47927 and the present invention are compared below. The PCT publication has some similarities to the invention. PCT publication WO98/47927 discloses the use of macromonomer composition, which include macromonomer at a high concentration of 95 wt. %. However, the publication differ from the present invention in that the macromonomer composition was produced at a low temperature of 150° C. and that the ratio of the methacrylate, namely the first vinyl monomer having alkyl group in the α-position with respect to the total amount of all the monomers used for production of the macromonomer composition is low (approximately 10 wt. %). In addition, the PCT publication teaches that the macromonomer content in the macromonomer is extremely low (20 to 50 wt. %) in the case where the ratio of the used first vinyl monomer with respect to the total amount of all the monomer provided for production of the macromonomer composition is high (40 to 70 wt. %). It is clear that only those copolymers having low copolymerization rate can be obtained if copolymerization with the second vinyl monomer is carried out by using the above described macromonomer composition.

On the other hand, the macromonomer composition used in the present invention includes the first vinyl monomer at a high concentration (10 to 80 wt. %) with respect to the total amount of all the monomer provided for production of the macromonomer composition and also includes the macromonomer at a high concentration (60 to 100 wt. %). It is presumed that an important factor for obtaining such macromonomer composition is the polymerization temperature between 160 and 350° C. at the production of the macromonomer composition and that the ceiling temperature of the first vinyl monomer relates to the formation of such macromonomer.

In the present invention, the macromonomer composition obtained by using for example methacrylic acid and methacrylate as the first vinyl monomer has a higher glass transition point than a macromonomer composition obtained by means of less first vinyl monomer. Through a reaction between such macromonomer composition and a second vinyl monomer, a graft copolymer or a block copolymer having a macromonomer unit having a high glass transition point can be obtained at a high yield. The present invention has above described technical feature and the invention is definitely different from that described in PCT publication WO98/47927.

EXAMPLES

Production Example 1

Production of Macromonomer

Composition A1

Ethyl 3-ethoxypropionate was filled in a 500 ml pressurized agitation-type reactor having a hot oil heater. The temperature within the reactor was set at 250° C. The pressure within the reactor was set, either at or to exceed a vapor pressure of ethyl 3-ethoxypropionate by means of pressure adjuster. A monomer mixture as a first vinyl monomer was prepared by weighing methyl methacrylate (hereinafter referred to as "MMA") 35 part by weight, cyclohexyl acrylate (hereinafter referred to as "CHA") 40 part by weight, acrylic acid (hereinafter referred to as "AA") 25 part by weight and di-t-buthyl peroxide (hereinafter referred to as "DTBP") 0.5 part by weight. The mixture was stored in a raw material storage tank. The mixture was continuously supplied from the raw material storage tank to the reactor by retaining the reactor at a constant pressure. The rate of feed then was set so that the retention period of the mixture within the reactor was 12 minutes. The reaction liquid was continuously retracted from the outlet of the reactor in an amount equal to the feed of the monomer mixture. The reactor temperature was kept in a range between 248 and 250° C. while continuously supplying the monomer mixture. The reaction liquid which was retracted from the reactor outlet was introduced into a thin film evaporator. A macromonomer composition was obtained by removing unreacted monomer from the reaction liquid. Extraction of a macromonomer composition A1 from the outlet of the thin film evaporator was started 90 minutes after starting supply of the monomer mixture and the extraction was conducted for 60 minutes. The polymer was recovered at 78 wt. % among the supplied monomers. In other words, the monomer conversion rate was 78%.

The average molecular weight of the macromonomer composition A1 was measured by gel permeation chromatography (hereinafter referred to as "GPC") using tetrahydrofuran solvent. The number average molecular weight (hereinafter referred to as "Mn") of the macromonomer composition A1 was 1270 by conversion from polystyrene, and the weight average molecular weight (hereinafter referred to as "Mw") was 2500. The concentration of ethylene unsaturated bond in any terminal of the macromonomer composition A1 was measured by $^1$H-NMR. The macromonomer content in the macromonomer composition A1 calculated from the number average molecular weight and the concentration of terminal ethylene unsaturated bonds was 76 wt. %.

Production Examples 2–9

Production of Macromonomer

Compositions A2–A9

The macromonomer compositions were produced through the process steps similar to Production Example 1 except that the kind and amount of monomer and polymerization initiator and the reaction temperatures were changed as shown in Table 1. The average molecular weight and macromonomer content were measured. The results are shown in Table 1. The macromonomer contents shown in Table 1 represent the proportions of the macromonomers contained in the macromonomer compositions.

| | Polymerization Condition | | | | | | | | Product | | | | |
|---|---|---|---|---|---|---|---|---|---|---|---|---|---|
| | Monomer (w/t part) | | | | | | Polymerization Initiator | Polymerization Temperature | Monomer Conversion Rate (%) | Macro-monomer composition | Molecular Weight | | Macromonomer Content (%) |
| | MMA | αMs | CHA | AA | BA | ST | DTBP | | | | Mn | Mw | |
| Production Example 1 | 35 | | 40 | 25 | | | 0.5 | 250 | 78 | A1 | 1270 | 2500 | 76 |
| Production Example 2 | 50 | | 25 | 25 | | | 0.5 | 250 | 87 | A2 | 1310 | 2470 | 90 |
| Production Example 3 | 55 | | 10 | 35 | | | 0.1 | 230 | 85 | A3 | 2020 | 4600 | 77 |
| Production Example 4 | | 20 | 45 | 35 | | | 0.1 | 250 | 86 | A4 | 1490 | 4220 | 61 |
| Production Example 5 | 44 | | | 56 | | | 0.1 | 250 | 75 | A5 | 1470 | 3080 | 100 |
| Production Example 6 | 28 | | | 72 | | | 0.1 | 250 | 86 | A6 | 1490 | 3050 | 90 |
| Production Example 7 | | | 65 | 35 | | | 0.1 | 270 | 75 | A7 | 1420 | 3070 | 79 |
| Production Example 8 | | 30 | | 35 | | 35 | 0.1 | 250 | 91 | A8 | 1690 | 3810 | 55 |
| Production Example 9 | | | | 100 | | | 0.03 | 250 | 87 | A9 | 1760 | 3710 | 62 |

MMA: methyl methacrylate
αMS: α-methyl styrene
CHA: cyclohexyl acrylate
AA: acrylic acid
BA: butyl acrylate
ST: styrene Example 1

Production of Copolymer B1

Macromonomer composition A1 125 part by weight and methyl ethyl ketone (hereinafter referred to as "MEK") 125 part by weight were filled in a reactor which has an agitator, a reflux condenser, a thermometer and a nitrogen inlet and the temperature was kept at 80° C. under a nitrogen atmosphere. Azo-bis-isobuthylonitrile (hereinafter referred to as "AIBN") 0.14 part by weight was filled to initiate the polymerization. A monomer mixture containing ethyl acrylate (hereinafter referred to as "EA") 125 part by weight, MEK 125 part weight and AIBN 0.47 part by weight was independently prepared as a second vinyl monomer. The second vinyl monomer was continuously dropped into the reactor for 3 hours. The reaction was continued for 1 hour after completing instillation. The reaction temperature was kept at 80° C. all through this process.

The molecular weight of the obtained copolymer B1 was measured by GPC. The Mn was 5330 and Mw was 249000.

The reaction rate of EA calculated from gas chromatography was 83%.

The reaction rate of the macromonomer composition A1 obtained from GPC was 70%. It was proved that the most of the macromonomers, contained at 76% in the macromonomer composition A1 has reacted.

Examples 2–6

Production of Copolymers B2–B6

The copolymers were produced through the processes similar to those of Example 1 except the conditions such as macromonomer composition, solvent, kind, and amount of vinyl monomer, reaction temperature and reaction period were changed as shown in Table 2. The molecular weights and the reaction rates were analyzed. The result is shown in Table 2.

The macromonomers of the used macromonomer compositions A7 and A9 in comparative examples 1 and 4 did not include the first vinyl monomer unit having alkyl group in the α-position. The viscosity increased significantly in the reactions between these macromonomer compositions and the second macromonomer to discontinue the reactions.

The macromonomer in the macromonomer composition A8 used in comparative examples 2 and 3 included more styrene unit (35 wt. %) as shown in Table 1 and the reaction rate of the macromonomer composition and the second vinyl monomer was extremely low.

The invention claimed is:

1. A method for producing a copolymer, comprising the steps of:

preparing a monomer mixture comprising raw material monomers, wherein said raw material monomers contain at least a first vinyl monomer having an alkyl group

TABLE 2

| | Copolymerization Conditions of the Macromonomers and the Vinyl Monomers. | | | | | | | | | | | | Products | | | |
|---|---|---|---|---|---|---|---|---|---|---|---|---|---|---|---|---|
| | Initial Materials Filled in the Reactor | | | | | Monomer Mixture for Instillation | | | | | | | | | | Reaction Rate (%) |
| | Macromonomer Comp. | | Solvent | | Polymer. Initiator | Monomer | solvent | | | Drop time | Time After Drop | Temp | Copolymer | Molecular Weight | | Macromonomer Composition | Vinyl Monomer |
| | kind | Wt. | kind | Wt. | AIBN | EA | kind | Wt. | AIBN | (Min.) | (Min.) | °C. | mer | Mn | Mw | tion | EA |
| Ex. 1 | A1 | 125 | MEK | 125 | 0.14 | 125 | MEK | 125 | 0.47 | 180 | 60 | 80 | B1 | 5330 | 249000 | 70 | 83 |
| Ex. 2 | A2 | 125 | MEK | 125 | 0.14 | 125 | MEK | 125 | 0.47 | 180 | 60 | 80 | B2 | 4680 | 46600 | 67 | 75 |
| Ex. 3 | A3 | 125 | MEK | 125 | 0.14 | 125 | MEK | 125 | 0.47 | 180 | 60 | 80 | B3 | 5640 | 76000 | 83 | 83 |
| Ex. 4 | A4 | 125 | MEK | 125 | 0.14 | 125 | MEK | 125 | 0.47 | 180 | 60 | 80 | B4 | 3900 | 60000 | 65 | 64 |
| Ex. 5 | A5 | 125 | MEK | 125 | 0.14 | 125 | MEK | 125 | 0.47 | 180 | 60 | 80 | B5 | 6000 | 87040 | 87.4 | 84 |
| Ex. 6 | A6 | 125 | MEK | 125 | 0.14 | 125 | MEK | 125 | 0.47 | 180 | 60 | 80 | B6 | 5400 | 197000 | 81 | 80 |
| Comp Ex. 1 | A7 | 125 | MEK | 125 | 0.14 | 83 | MEK | 83 | 0.31 | 120 | 0 | 80 | B7 | Polymerization discontinued due to significant increase in the viscosity | | | |
| Comp Ex. 2 | A8 | 125 | MEK | 125 | 0.14 | 125 | MEK | 125 | 0.47 | 180 | 60 | 80 | B8 | 1900 | 7600 | 21 | 7 |
| Comp Ex. 3 | A8 | 125 | MIBK | 125 | 3 | 125 | MIBK | 125 | 1 | 180 | 60 | 90 | B9 | 2600 | 14400 | 27 | 44 |
| Comp Ex. 4 | A9 | 125 | MEK | 125 | 0.14 | 83 | MEK | 83 | 0.31 | 120 | 0 | 80 | B10 | Polymerization discontinued due to significant increase in the viscosity | | | |

MEK: methyl ethyl ketone
MIBK: methyl isobuthyl ketone
EA: ethyl acrylate
AIBN: azo-bis-isobutylonitrile Comparative Examples 1–4

Production of Copolymers B7–B10

The copolymers were produced through the similar steps of Example 1 except the conditions, such as macromonomer composition, solvent, kind, and amount of vinyl monomer to be copolymerized, reaction temperature and reaction time were changed as shown in Table 2. The molecular weights and the reaction rates were measured. The result is shown in Table 2.

It was proved that the macromonomer compositions and the vinyl monomers had high reaction rates in Examples 1 through 6 and that they were efficiently copolymerized.

in the α-position at 40–70 wt. % and styrene at 0–30 wt. % with respect to the total amount of said raw material monomer mixture;

heating a reactor in a temperature range between 160 and 350° C. and supplying said monomer mixture into said reactor whereby a reaction liquid is formed within said reactor in a first reaction step, wherein said reaction liquid contains said raw material monomers and polymers formed by reacting said raw material monomers, wherein the concentration of said raw material monomers and said polymers is in a range between 70 and 100 wt. %, and wherein said polymers contain at least one macromonomer at a concentration in a range between 60 and 100 wt. %; and reacting said polymers with a second vinyl monomer in a second reaction step to obtain said copolymer.

2. The method according to claim 1 wherein said first vinyl monomer is methacrylic acid or methacrylate ester.

3. The method according to claim 1, wherein the polymers are produced through continuous polymerization.

4. The method according to claim 1, wherein the polymers contain the macromonomer at 60 wt. % or more.

5. The method according to claim 1, wherein the polymers are obtained in a polymerization period of between 0.1 and 1 hour.

6. The method according to claim 1 wherein the macromonomer in the polymers have a structure shown by formula (1) shown below:

(1)

wherein X represents —COOR,—CONR$_2$, —OR, —OCOR, —OCOOR, —NCOOR, halogen atom, —CN or optionally substituted phenyl or aryl group; R represents alkyl, phenyl, benzyl, polyalkylene glycol, dialkylamino alkyl or trialkoxy silylalkyl optionally substituted by alkyl, hydroxyalkyl, alkoxyalkyl or other substituent, or hydrogen atom; M represents a monomer unit; and n represents a positive integer representing polymerization degree.

7. The method according to claim 2, wherein the polymers are produced through continuous polymerization.

8. A method for producing a copolymer, comprising the steps of:

preparing a monomer mixture comprising raw material monomers, wherein said raw material monomers contain at least a first vinyl monomer having an alkyl group in the α-position at 40–70 wt. % and styrene at 0–30 wt. % with respect to the total amount of said raw material monomer mixture;

heating a reactor in a temperature range between 160 and 350° C. and supplying said monomer mixture into said reactor whereby a reaction liquid is formed within said reactor, wherein said reaction liquid contains said raw material monomers and polymers obtained from said raw material monomers, wherein the concentration of said raw material monomers and said polymers is in a range between 70 and 100 wt. %, and wherein said polymers contain at least one macromonomer at a concentration in a range between 60 and 100 wt. %;

removing said raw material monomers from said reaction liquid to obtain a macromonomer composition; and reacting said macromonomer composition with a second vinyl monomer to obtain said copolymer.

9. The method according to claim 1, wherein the second reaction step occurs at a temperature that is between 30 and 130° C.

10. The method according to claim 1, wherein the step of reacting said polymers with a second vinyl monomer occurs at a temperature that is between 30 and 130° C.

* * * * *